United States Patent

Cloutier

[11] 3,711,214
[45] Jan. 16, 1973

[54] DEVICE FOR USE IN TURNING OPERATIONS ON PIPE ENDS AND IN BORING HOLES IN THE SLIDES THEREOF

[76] Inventor: Alfred J. Cloutier, P.O. Box 455, Saco, Maine 04072

[22] Filed: July 2, 1970

[21] Appl. No.: 51,822

[52] U.S. Cl. .......................408/92, 29/560, 408/137
[51] Int. Cl. .........................B23b 41/00, B23p 23/00
[58] Field of Search ....408/92, 95, 87, 137; 269/288, 269/287

[56] References Cited

UNITED STATES PATENTS

| 455,890 | 7/1891 | Smith | 408/95 |
| 2,279,636 | 4/1942 | Mueller et al. | 408/92 |

FOREIGN PATENTS OR APPLICATIONS

| 7,809 | 1/1906 | Great Britain | 408/92 |

Primary Examiner—Gil Wedenfeld
Attorney—Abbott Spear

[57] ABSTRACT

Devices are disclosed for performing a wide range of operations on pipes including the turning of male ends and forming annular grooves thereon, cutting off lengths, or providing threaded holes in the side thereof. Each device includes a basic part, attachments including various tools, and clamps. The basic part comprises a threaded shaft provided with a head and a threaded sleeve provided with a head and slidable on the shaft. Where the device is to be clamped to the interior of a pipe, a wedge-actuated clamp is threaded on the sleeve and operated by rotating the sleeve and an attachment with the appropriate tool is secured to the shaft head for engagement with the exterior of the pipe. Where the tool is to be advanced as the shaft is turned, a nut is provided that may be threaded on the shaft and has a threaded counterbore enabling it also to be attached to the end of the sleeve. Where a hole is to be formed in the side of the pipe, the nut is part of a clamp secured about the pipe with its axis at right angles thereto and the tool is secured axially to the end of the shaft.

6 Claims, 8 Drawing Figures

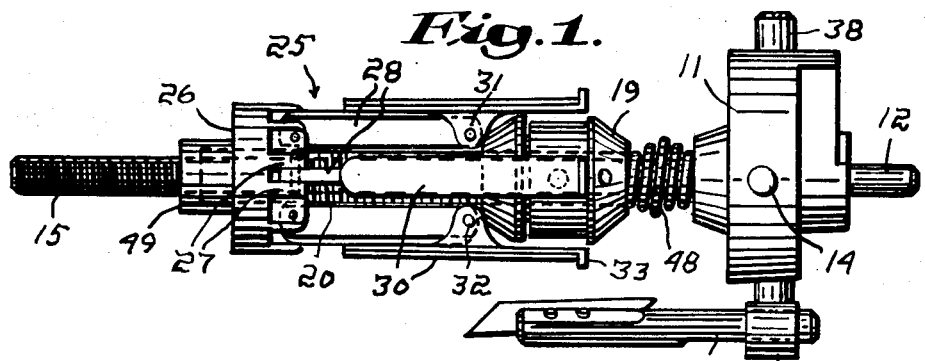
Fig.1.
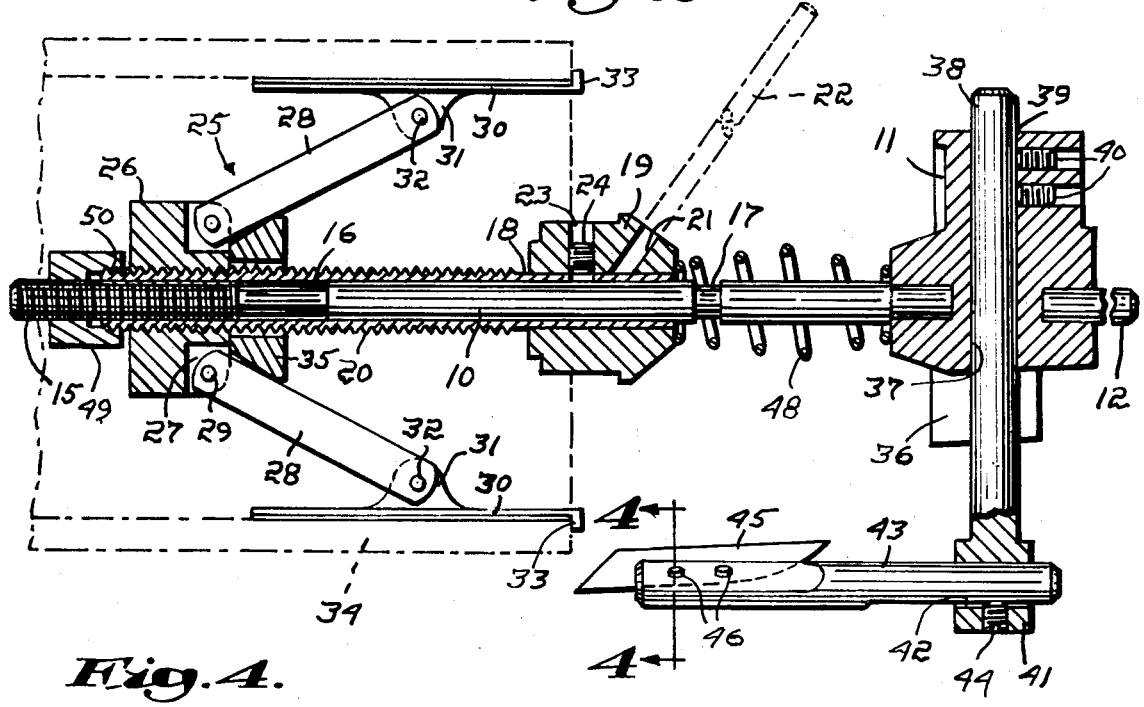
Fig.2.
Fig.4.
Fig.3.
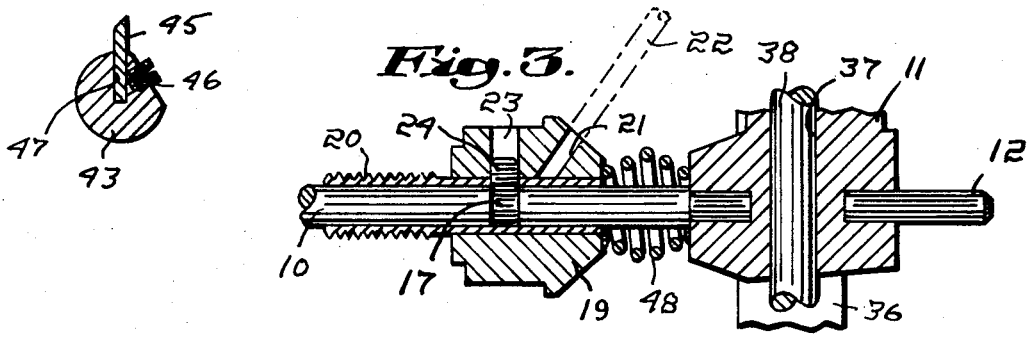
Inventor:
Alfred J. Cloutier,
by
Attorney

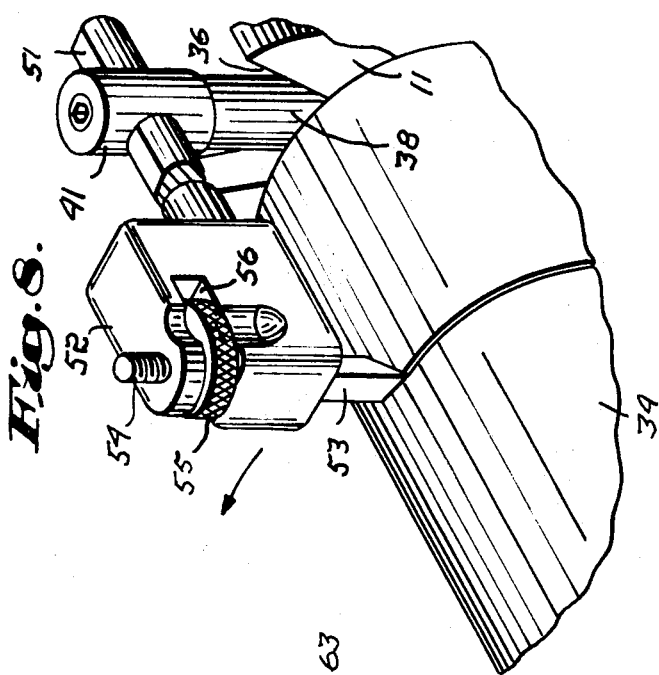
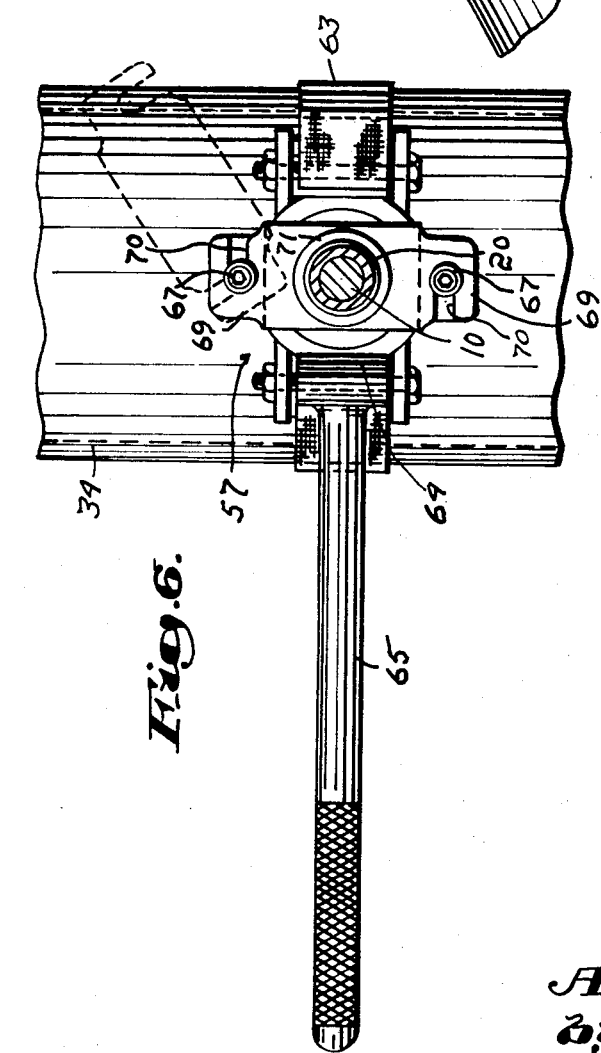
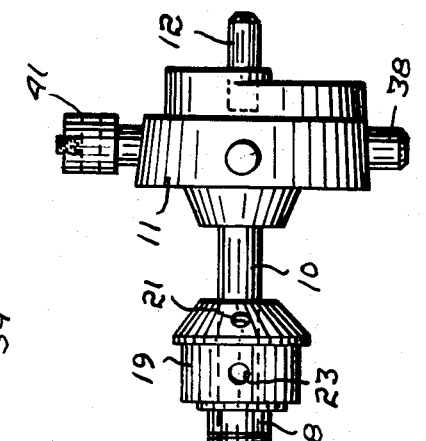
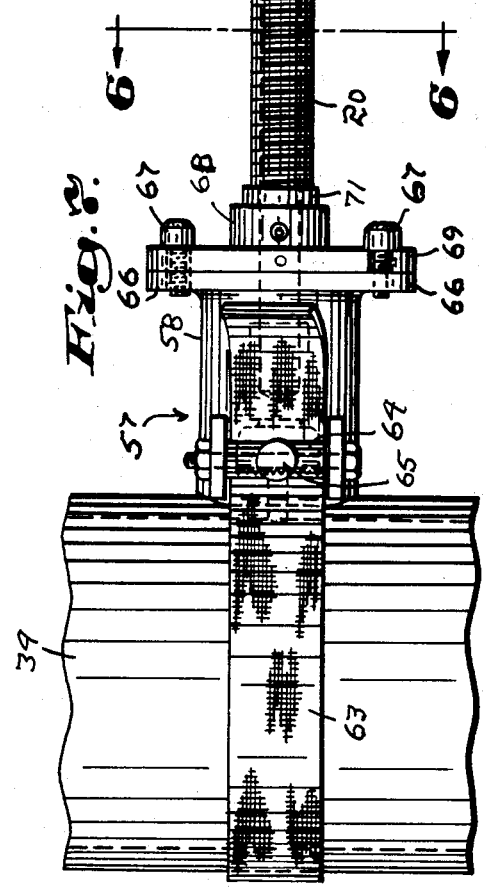

DEVICE FOR USE IN TURNING OPERATIONS ON PIPE ENDS AND IN BORING HOLES IN THE SLIDES THEREOF

The present invention relates to devices for use in forming various operations on pipes and includes attaching clamps useable in the alternative to clamp the tool to the interior of the pipe or to the exterior thereof.

In my U.S. Pat. No. 3,171,309 a device is disclosed that enables male ends or grooves to be turned on the ends of pipes or ends to be cut therefrom. The device consisted of a shaft provided with a head, a threaded sleeve provided with a head and slidable on the shaft with a ring threaded on the sleeve and connected to clamping shoes by links held apart by a wedge so that, on rotation of the sleeve, the shoes lock against the interior of the pipe with the shaft and sleeve held axially thereof and the shaft free to rotate. A tool attached to the shaft head for cutting engagement with the outer surface of the pipe is operated by turning the shaft. Where the tool is, for example, to cut off a pipe length, care had to be exercised to ensure against axial movement of the shaft while in the case of a tool for forming a male end, axial shaft movement was necessary and accurately effected by means of a nut threaded on the shaft and having a threaded counterbore receiving the free end of the sleeve.

While the tool disclosed in said patent provided substantial advantages, the objective of the present invention is to increase its versatility to enable it also to be used for boring and tapping holes in the sides of pipe lengths, an objective attained by providing that the nut is part of a clamp adapted to be secured about a pipe and spaced therefrom to enable a drill or tap to be threaded on the free end of the shaft.

Another objective is to provide means by which cut-off and grooving operations can be more readily effected, an objective attained with a means to lock the sleeve to the shaft to permit shaft rotation by preventing its axial movement.

In the accompanying drawings, there is shown an embodiment of the invention illustrative of these and other of its objectives, novel features and advantages.

In the drawings:

FIG. 1 is an elevational view of a device in accordance with the invention assembled for use in such operations as turning a pipe end;

FIG. 2 is a longitudinal section of the device, on an increase in scale, showing it secured to a pipe for performing such an operation;

FIG. 3 is a fragmentary view showing the shaft held by the sleeve to prevent its axial movement;

FIG. 4 is a section taken along the indicated lines 4—4 of FIG. 2;

FIG. 6 is a section taken along the indicated lines 6—6 of FIG. 7;

FIG. 7 is a side view of the device when thus used; and

FIG. 8 is a fragmentary, perspective view showing the device in use in pipe cutting.

Figure 5:
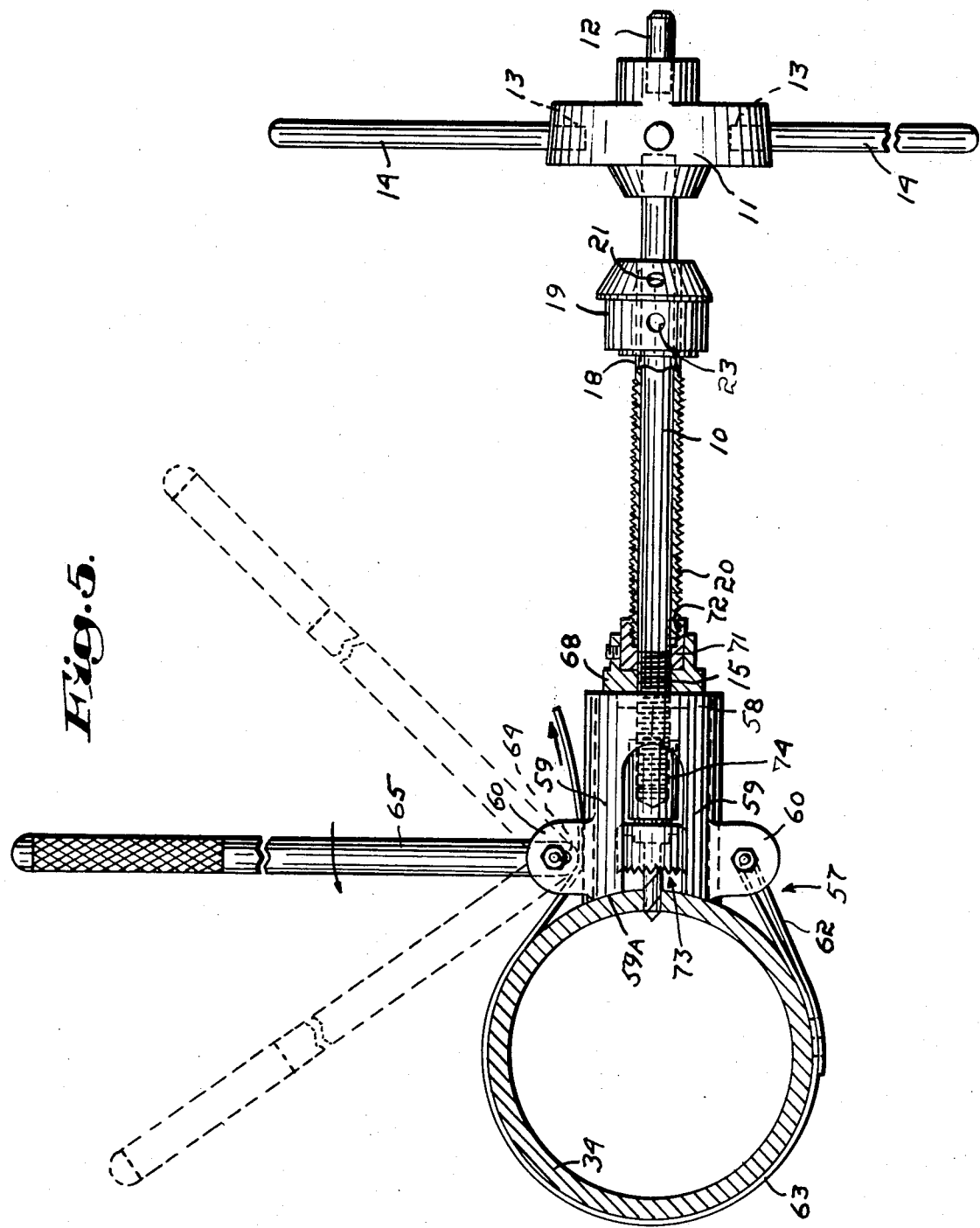
FIG. 5 is a longitudinal section of the device assembled for use in forming a hole in the side of the pipe.

The device shown in FIGS. 1 and 2 is substantially that of U.S. Pat. No. 3,171,309, but is herein detailed with respect to its original uses and its new function of forming holes through the sides of pipes.

The part of the tool that is basic comprises a shaft 10 having a head 11 fixed thereon and provided with an axial stub 12 to receive the chuck of a tool, not shown, if one is used to rotate the shaft 10. The head 11 is also provided with radial threaded bores 13 enabling handles 14 to be detachably attached thereto, see FIG. 5. The other end of the shaft 10 is threaded as at 15 beyond a section 16 of reduced diameter. In accordance with the invention, the shaft 10 has an annular groove 17 spaced a short distance below the head 11. A sleeve 18 is a slidable fit on the shaft 10 and is provided with a head 19 and its lower end is threaded as at 20. The sleeve head 19 has outwardly and rearwardly inclined bores 21 enabling handles 22 to be detachably attached thereto for use in turning the sleeve 18 for purposes presently to be described. In accordance with the invention, the head 19 also has radial bores 23 opening through the sleeve 18 for set screws 24 which, when the head 19 is properly positioned, may be advanced to enter the groove 17 as illustrated by FIG. 3 thereby to prevent axial movement of the shaft while permitting it to rotate for purposes presently to be described.

The use of the tool in turning male ends on pipe lengths will first be described. For such uses, a clamping unit, generally indicated at 25, is employed. The unit 25 comprises a ring 26 internally threaded to enable it to be attached to the sleeve 18 and provided with a series of spaced pairs of ears 27. A series of links 28 are provided, one for each pair of ears 27 with one end secured therebetween by a pivot 29. A shoe 30 is provided for each link 28, each shoe 30 having a centrally located pair of ears 31 connected to the other end of the appropriate link 28 by a pivot 32. Each shoe 30 has an outwardly disposed shoulder 33 for engagement with the end of a pipe 34. The pipe, while commonly of plastics, may be of any other material. The clamping unit 25 also includes an annular wedge 35 adapted to be slid along the sleeve 18 before the ring 26 is threaded thereon. The wedge 35 is positioned to hold the links 28 outwardly when the ring 26 is threaded into a position in which the shoes 30 are a loose fit in the end of the pipe 34. With pipe of materially larger diameters, the wedge 35 is replaced by one of an appropriately increased diameter. With the shoes loosely fitted in the pipe end, the head 19 is turned causing the links 28 to be wedged apart by the wedge 35 and forcing the shoes 30 into tight holding engagement with the interior surface of the pipe with the sleeve 18 axially fixed and the shaft 10 free to rotate and to be moved axially unless the set screws 24 have been entered into the shaft groove 17.

The head 11 has a cutout 36 of substantial radial extent and a bore 37 extending diametrically through it and opening into the cutout 36. A tool supporting shank 38 having a flat 39 extends through the bore 37 and is locked therein by set screws 40. At one end of the shank 38, there is a head 41 having a transverse bore 42 slidably receiving a tool shank 43 and provided with a set screw 44 to lock the shank 43 with its cutter 45 in a desire position relative to the outer surface of the pipe 34, the cutter 45 being shown as one capable of forming a tapered male end. It will be noted, see FIG. 4, that the shank 43 has set screws 46 opening into the slot 47 for the cutter 45 at an angle of about 45° so that the set screws are operable to seat the cutter 45 against the opposite side and the bottom of the slot 47. It will be appreciated that with small diameter pipes, the shank 38 may be disposed with its head 41 within the cutout 36 and extended as required for pipes of larger diameters.

There are two bases for operating the tool in forming a male pipe end or making other turning operations thereon. In one of these, the chuck of a tool is secured to the stub 12 and as the shaft 10 is turned, it is pushed inwardly against the resistance of a spring 48 interposed between the heads 11 and 19 to advance the cutter 45. The alternative basis, of particular importance when the head 11 is to be rotated by means of the handles 14, requires the use of a nut 49 threaded to receive the shaft 10 and having a counterbore 50 threaded to receive the free end of the sleeve 18. With this arrangement, as the shaft 10 turns, it moves axially to provide a positive feed for the cutter 45.

When it is desired to cut off a piece of pipe or form an annular groove therein, a cut-off tool such as that shown in FIG. 6 is used. Such a tool has a shank 51 provided with a head 52 having a square passage for the cutter 53 of the same cross sectional size and shape and having a stem 54 threaded through a nut 55 held captive in head slot 56. In such an operation, axial movement of the tool is not wanted. In accordance with the invention, such movement is prevented by positioning the head 19 so that the set screws 24 may be advanced into the groove 17 thereby to prevent axial movement of the shaft 10 while permitting it to be turned relative to the anchored sleeve 18. For this purpose, the nut 49 is not used.

It is often necessary to bore a hole in the side of a pipe and to form threads in such a hole. In accordance with the invention, see FIGS. 5, 6, and 7, these operations can be effected with the basic device (the shaft 10 and its head and the sleeve 18 and its head 19) and a clamp generally indicated at 57 and shown as a mount 58 having a pair of spaced legs 59 having outwardly and forwardly inclined pipe engaging faces 59A. Each leg 59 has a pair of ears 60 with one pair in support of a rod 61 holding a loop 62 at one end of a strap 63. The other pair of ears 60 rotatably supports a knurled cam 64 provided with an operating handle 65 enabling the cam 64 to be turned in the indicated direction from a position in which the free end of the strap 63, after having been passed about the pipe, may be fed between the cam and the proximate leg 59 into a position in which the strap is cammed into a tight gripping relationship with the encircled pipe.

The mount 58 is provided with oppositely disposed flanges 66 each having a clamping screw 67 threaded therethrough.

A holder 68 has oppositely disposed flanges 69 disposed and dimensioned to overlie the flanges 66 and having oppositely opening slots 70 accommodating the clamping screws 67 and enabling the holder to be quickly and easily removed simply by loosening the screws 67. The holder 68 carries a nut 71 threaded to receive the shaft 10 and having a threaded counterbore 72 enabling the sleeve 18 to be attached thereto. With the end of the shaft 10 threaded through the nut 71, a hole-forming tool 73 having an internally threaded shank 74 may be threaded thereon. It will be appreciated that the mount 58 provides a chamber dimensioned to accommodate such tools without initial contact with the pipe. As the shaft 10 is now turned, the tool 73 is advanced to cut the hole. Thereafter the tool 73 may be removed and replaced with a tap, not shown. In effecting such replacement, it is only necessary to detach the holder 67 with the attached device.

I claim:

1. A device for use with tools for such operations as forming and or threading a hole in the side of a pipe, said device comprising a threaded shaft to one end of which the tool is to be attached, a threaded sleeve slidable on said shaft with reference to which the shaft is rotatable, and clamp means attachable to the pipe and including a mount and a fixed nut held by said mount in spaced relationship to the pipe and through which the shaft is threaded and which establishes a fixed angular relationship between the axis of the shaft and the axis of the pipe, and said nut also having a threaded counterbore into which the sleeve is threaded to become part of the mount and function as a guide.

2. The device of claim 1 in which the mount includes a pair of legs each engageable with the pipe and of sufficient length to space the nut from the pipe by a distance greater than the length of the tools when attached to the shaft.

3. The device of claim 1 in which the nut is detachable from the mount.

4. The device of claim 1 in which the mount has a chamber dimensioned to accommodate the tool when attached to the shaft and includes a pair of flanges and a flanged part closing the chamber and to which the nut is attached, and means detachably attaching the flanged part to the pair of flanges.

5. A clamp for use with a device having a threaded shaft to one end of which a hole forming tool is to be attached and a threaded sleeve slidable and rotatable on said shaft, said clamp including means attachable to the pipe and a mount provided with a fixed nut held by said mount in spaced relationship to the pipe and through which the shaft is threaded and which establishes a fixed angular relationship between the axis of the shaft and the axis of the pipe, and said nut having a threaded counterbore into which the sleeve is threaded to become part of the mount and function as a guide.

6. The clamp of claim 5 in which the mount includes a chamber portion dimensioned to accommodate the tool when attached to the shaft and a closure for the chamber portion and detachably attached thereto, the nut being a part of the closure.

* * * * *